May 22, 1945. G. I. HENSON 2,376,432
CHUCK SLEEVE GEAR GUARD AND DRILL BIT HOLDING JAW GUARD COMBINED
Filed Dec. 27, 1943

INVENTOR
Granville Irving Henson

Patented May 22, 1945

2,376,432

UNITED STATES PATENT OFFICE 2,376,432

CHUCK SLEEVE GEAR GUARD AND DRILL BIT HOLDING JAW GUARD COMBINED

Granville Irving Henson, Dallas, Tex.

Application December 27, 1943, Serial No. 515,772

2 Claims. (Cl. 77—55)

The invention relates to improvements in a combination chuck sleeve gear and drill bit holding jaw guard, operating in conjunction with electric and pneumatic hand drills, and the object of the improvement is to provide a guard for the tightening gear end of the sleeve, and a guard for the jaws holding the drill bit.

Figure 1:
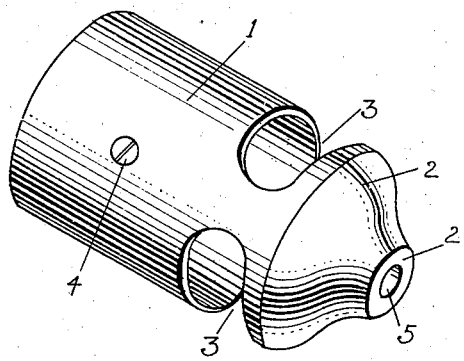
Figure 2:
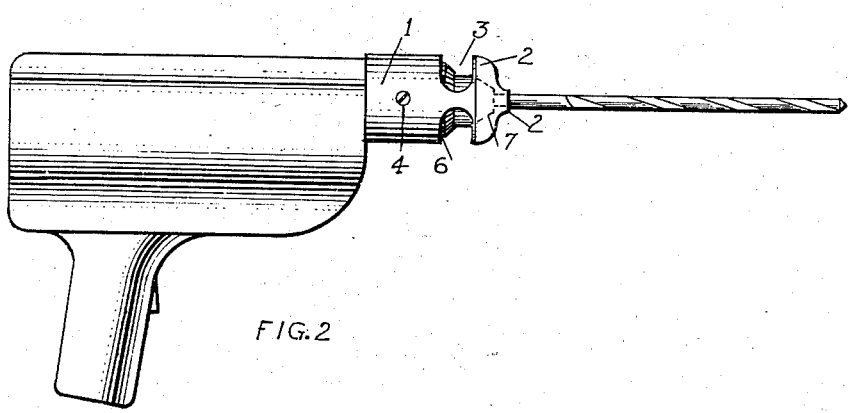

One form of the invention is illustrated in the accompanying drawing, in which Figure 1 is an isometric view of the guard, and Figure 2 is an elevation view of the guard in position on a hand drill.

The base 1 supports the guard 2, 2 for the gear end of the rotating chuck sleeve 6 and the jaws 7 (see Fig. 2). Openings 3, 3 Figure 1 are for admission of a chuck key to the tightening gear of the sleeve. The base 1 fits around the chuck sleeve of the drill, supporting that part of the guard 2, 2 in such manner that it prevents the revolving tightening gear end of the chuck sleeve 6, and the revolving jaws 7, from coming in contact with objects being drilled, and damaging them. This feature of the invention is perfectly illustrated in Figure 2 where it will be seen that the guard 2, 2 is in front of the gear 6 and jaws 7. The base 1 is made secure to the drill by means of a screw 4. The opening 5, Figure 1 is for the passage of the drill bit through the guard to the jaws.

I am aware that prior to my invention chuck guards have been made operating in conjunction with a drill. I therefore do not claim such a combination broadly.

I claim:

1. In combination with a portable electric or pneumatic hand drilling machine having a revoluble key actuated chuck sleeve and revoluble tool jaws projecting therefrom; a guard comprising a cylindrical base portion rigidly secured to a stationary portion of the machine and snugly fitting about the revolving chuck sleeve but spaced therefrom, said guard having a reduced end portion projecting beyond the base portion and tapered to closely fit the ends of the revolving tool jaws, said reduced end portion being provided with an axial opening just sufficient to pass the drill and being rigidly supported in spaced relation in front of the base member, thus providing a lateral opening between the base member and end portion for the insertion of a chuck key to the tightening gear of the chuck sleeve.

2. A guard for use with a drilling machine having a revoluble key-actuated chuck sleeve and revoluble tool carrying jaws projecting therefrom; said guard being of light-weight unitary construction and of substantially the same thickness throughout, and comprising a cylindrical base portion adapted to be secured to a stationary portion of the machine and to closely fit about the revolving chuck sleeve without contacting the same, and an end portion projecting beyond the base portion and tapered to closely fit the ends of the revolving tool jaws, said end portion being provided with an axial opening just sufficient to pass the drill tool, and a pair of arms connecting the base and end portions of said guard, the guard being cut away between the connecting arms thus providing openings between the base and end portions for the insertion of a chuck key to the tightening gear of the chuck sleeve.

GRANVILLE IRVING HENSON.